March 28, 1961 G. BRUCK 2,977,592
ELEVATION ANGLE MEASURING SYSTEM
Filed Sept. 1, 1959 2 Sheets-Sheet 1

INVENTOR.
GEORGE BRUCK
BY
ATTORNEYS

March 28, 1961  G. BRUCK  2,977,592
ELEVATION ANGLE MEASURING SYSTEM
Filed Sept. 1, 1959  2 Sheets-Sheet 2
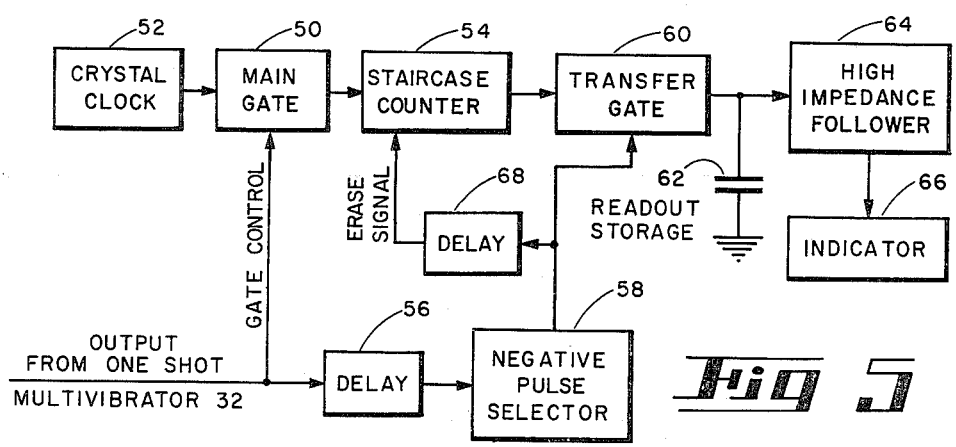
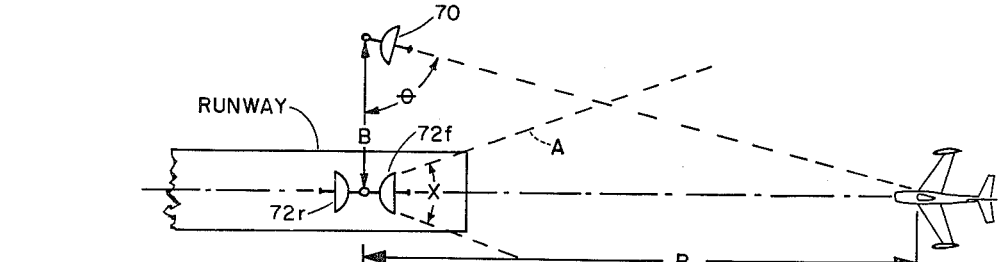
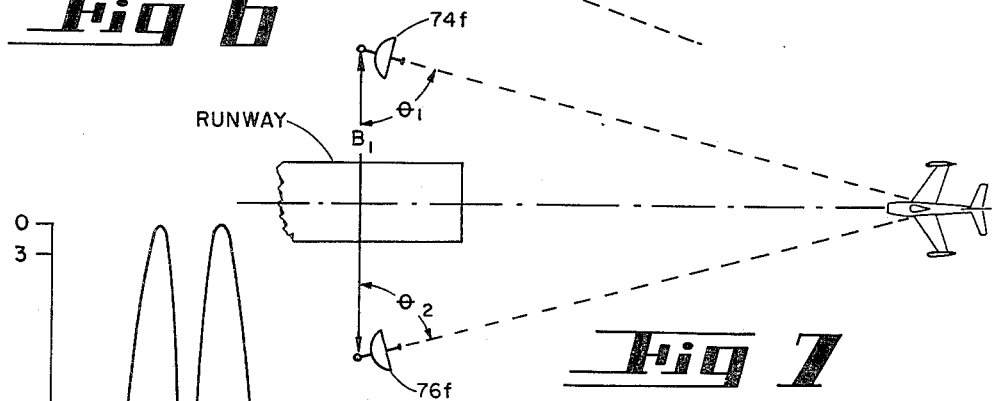
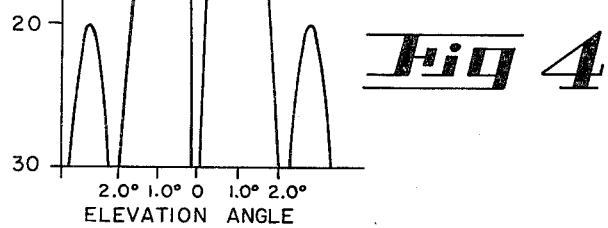
INVENTOR.
GEORGE BRUCK
BY
ATTORNEYS United States Patent Office 2,977,592
Patented Mar. 28, 1961

2,977,592

ELEVATION ANGLE MEASURING SYSTEM

George Bruck, Cincinnati, Ohio, assignor to Avco Corporation, Cincinnati, Ohio, a corporation of Delaware Filed Sept. 1, 1959, Ser. No. 837,445

6 Claims. (Cl. 343—108)

This invention relates to a position-determining system for use in the precision landing of aircraft.

Many systems have been devised for landing aircraft under conditions of poor or zero visibility, but to date all of these systems have been complex and leave much to be desired in accuracy. In addition, most of the systems require that control of the aircraft be exercised from the ground station. For example, in the conventional ground control approach systems the pilot is given instructions by the ground operator of the radar equipment. By means of this invention I provide a system in which the necessary position information is gathered at the airplane by means of simple, passive equipment, thereby leaving complete control with the pilot.

While the principles of my invention are applicable for determining range, azimuth and elevation, it will be described mainly in connection with an elevation angle-measuring system. In general, my invention comprises a ground transmitting station located alongside a runway and a simple receiving set located in the aircraft. The ground station radiates energy in a narrow, fan-shaped beam which periodically sweeps up and down at a precisely controlled rate. The function of the receiver is to detect the beam as it travels past the aircraft and to measure the time interval between the reception of an upward-moving beam and a downward-moving beam. This time interval will be an accurate representation of the beam elevation angle and may be determined by digital or analog computer methods.

A primary object of this invention is to provide a relatively simple and inexpensive system for deriving height, azimuth and range measurements with increased accuracy.

Another object of this invention is to provide an angle determining system for aircraft requiring passive and relatively simple aircraft installation while supplying improved data for the aircraft operation.

Another object of this invention is to provide a system which will permit any aircraft equipped with a simple receiving unit to determine elevation, azimuth and range accurately and continuously from a fixed ground station.

Still another object of this invention is to oscillate a narrow beam of energy through a predetermined angle from a fixed reference plane and to provide an aircraft in the path of said oscillating beam of energy with means for detecting said beam each time it passes the aircraft, and for measuring the time interval between successive detections of said beam during one cycle of oscillation.

Still another object of this invention is to provide a system for determining the angle of elevation of an aircraft with respect to a given point on a landing strip by oscillating a fan-shaped beam which is narrow in the vertical direction up and down through a predetermined angle at an accurately controlled rate past the aircraft, and to provide a receiver on the aircraft for detecting energy from said beam as said beam passes the airplane during its upward and its downward sweeps, the receiver including means for measuring the time interval between energy detected on an upward sweep and energy detected on a downward sweep, the time interval being a measure of the angle of elevation of the aircraft.

Other objects and a more complete understanding of the precise nature of this invention may be had from a study of the following detailed description and the accompanying drawings, in which:

Fig. 4 is a curve illustrating the antenna pattern generated by the transmitter incorporated in the elevation angle measuring system;

Fig. 5 illustrates a modification of the receiver incorporated in the elevation angle receiving system;

Fig. 6 illustrates the invention as applied to a range and azimuth measuring system; and Fig. 7 illustrates another method of triangulation for determining range and azimuth.

Figure 1:
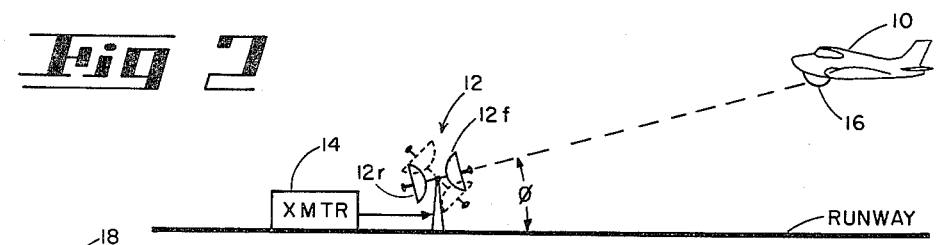
Fig. 1 is a schematic representation of a preferred elevation angle measuring system.

A preferred elevation angle measuring system incorporating the principles of my invention is diagrammatically illustrated in Fig. 1, wherein is shown an aircraft 10 at an elevation angle $\phi$ with respect to a pair of antennas generally indicated at 12 and located along the runway of an air field. As schematically illustrated, the antennas 12 include a forward-looking antenna $12_f$ and a rearward-looking antenna $12_r$, both supplied with energy from a continuous wave transmitter 14 which may conveniently be housed in a small package and be mounted in the base of the antennas. While this invention is applicable to a wide range of frequencies, it will be more efficient if the transmitter 14 is operated in the UHF or lower SHF bands, radiated power in the order of 10 watts being sufficient for the normal landing strip installation. The transmitter 14 is locked to a fixed frequency by means of a high gain AFC circuit.

The particular type of antennas forms no part of this invention and, therefore, the details of the antennas 12 are not shown. However, the preferred system requires that the antenna $12_f$ and the antenna $12_r$ be capable of generating a very narrow beam in the vertical direction and be provided with means for vertically scanning or oscillating the beam at a very accurately controlled rate through a predetermined angle. For a purpose which will hereinafter be evident, the antennas $12_f$ and $12_r$ are each used during only alternate oscillations or scanning cycles, the antenna $12_f$ being operative for vertically scanning a beam in the forward direction along the runway during one cycle, and the antenna $12_r$ being operative for vertically scanning a beam in the rearward direction along the runway during the alternate cycle.

An antenna suitable for the purposes of this invention is disclosed in the co-pending application of John A. Kuecken entitled "Phase Shift Scanning Antenna," Serial No. 810,136, filed April 30, 1959, and assigned to the same assignee as this invention. Although the Kuecken phase shift scanning antenna employs mechanical phase-shifting techniques for scanning the beam, electronic phase shifters will be equally suitable for this invention provided that a linear time vs. angle relationship can be maintained. Furthermore, a system in which the beam is scanned by mechanically oscillating the antennas is also feasible, although this type of arrangement is not preferred, since the inertia of such systems is likely to introduce errors.

Figure 2:
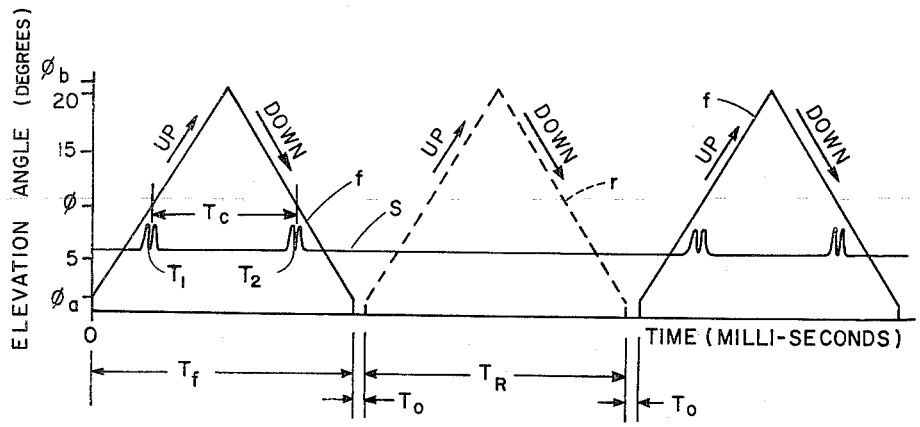
Fig. 2 is a set of curves illustrating the principles of operation of my invention.

The relationship between the elevation angle of the oscillating beam with respect to time is shown by the curves $f$ and $r$ in Fig. 2, the curve $f$ representing the beam of the forward-looking antenna $12_f$ and the curve $r$ (in dotted lines) representing the beam of the rearward-looking antenna $12_r$. In addition, a curve S, representing the pattern of a signal detected at the receiver 16 and resulting from the detection of a beam at an elevation angle $\phi$ and having a generated pattern such as illustrated in Fig. 4, is plotted on the same time base.

Referring to Fig. 4, the transmitted beam is shaped to provide two peaks with a center null, the outside —10 db point being no more than 1.5 degrees below the center null between the peaks. The use of two identical units $12_r$ and $12_f$ facing in opposite directions along the runway permits a convenient center pole or A frame type mounting to accomplish alternate scanning on both sides of the center line normal to the array, and preferably, but not necessarily, the antenna scan rate may be 30 cycles per second for each of the antennas $12_r$ and $12_f$ with each antenna experiencing approximately 50% on time. In practice, a period of time $T_0$ is consumed while switching from antenna $12_f$ to antenna $12_r$, and vice versa. The null of the antenna may be scanned vertically approximately 20 degrees between two fixed reference angles $\phi_a$ and $\phi_b$ which, as illustrated, are equal to 1 and 21 degrees, respectively.

The pattern of the beam radiated by the antennas $12_f$ and $12_r$ should be wide enough in a horizontal plane to cover the entire required azimuth angle for normal air strip landings, thus eliminating the necessity for horizontal scanning. However, horizontal scanning can be included at a sacrifice in beam-on-target time.

As the antenna $12_f$ is scanned in a vertical direction from the lower reference elevation angle $\phi_a$ to the upper reference elevation angle $\phi_b$, an aircraft located at an angle $\phi$ will receive first (or upsweep) pulses at time $T_1$. Now, if the antenna is scanned downward from the elevation angle $\phi_b$ to the elevation angle $\phi_a$, the aircraft receiver will then detect second (or downsweep) pulses at the time $T_2$ as the beam passes the aircraft at essentially the same angle $\phi$. Knowing the rate of the scan (or the time T) and knowing the time interval $T_c$ between the times $T_1$ and $T_2$, the elevation angle $\phi$ can then be computed in accordance with the equation:

$$\phi = \phi_b - \frac{T_c}{T}[\phi_b - \phi_a]$$

Since $\phi_a$, $\phi_b$, and T are known values, it is necessary only to determine $T_c$ to compute $\phi$. Any aircraft located in the field of view of the rearward-looking antenna $12_r$ would detect similar signals spaced at a time interval depending on the elevation angle of that aircraft.

As was pointed out previously, every point in the space coverage of the antenna beam will be associated with a certain sequence of events, as far as radiation from the transmitter 14 is concerned. That is to say, at any elevation angle within a specified range of elevation angles, transmitted waveforms will be detected by the receiver 16 twice during each cycle. The receiver 16 is illustrated in Fig. 3 and is provided for the purpose of detecting the sharp null in the center of the detected waveform and for timing the interval between nulls.

Figure 3:
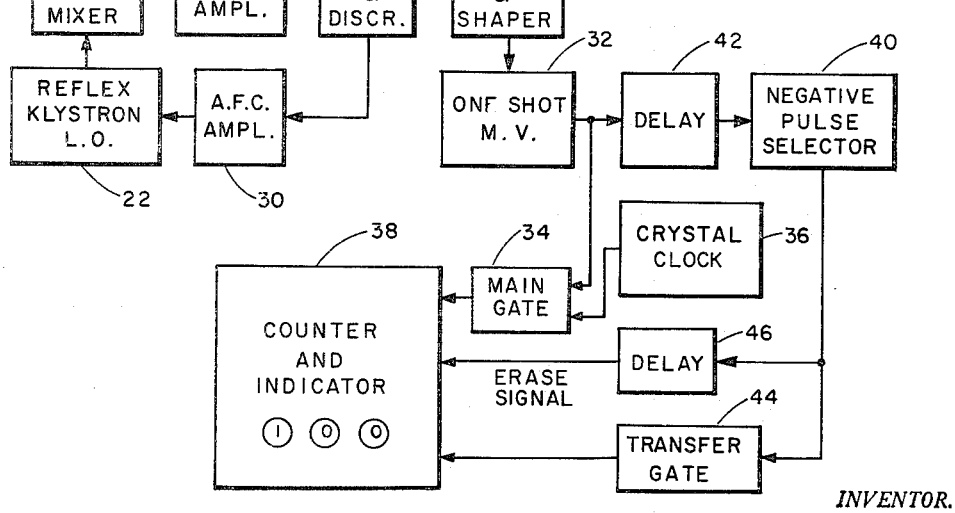
Fig. 3 is a block diagram illustrating an air-borne elevation angle receiving system.

Referring to Fig. 3, the incoming RF signals received at the antenna 18 are fed into a crystal mixer 20 where IF signals are generated as a result of the heterodyning action of a reflex klystron or other stable local oscillator 22. The IF output of the tuned crystal mixer 20 is amplified in an IF amplifier 24 which is followed by a detector and discriminator 26, the discriminator being used for automatic frequency control of the oscillator 22 and the detector providing the information output. The output of the detector is processed in a differentiator and shaper 28, first by differentiation and then by partial cancellation (elimination of the negative pulse). The resultant output of the differentiator 28 is a narrow timing pulse which is then used to actuate the following one-shot multivibrator 32. The output of the multivibrator 32 is utilized to actuate the counter and indicator system 38.

As the elapsed time between the first or upsweep pulse and the second or downsweep pulse provides the measure for the angles of elevation, it is necessary that the airborne receiver 16 measure the interval between these pulses in a proper sequence. That is to say, the system must measure the time $T_c = T_2 - T_1$, which is less than one cycle. This is accomplished by setting the automatic re-cycling time of the one-shot multivibrator 32 so that it is equal to the time $T_f$ or $T_r$. If the timing pulse received at the antenna 18 is the first or upsweep pulse, there will be sufficient time to permit reception of the second or downsweep pulse before automatic return of the one-shot multivibrator 32. However, if the first pulse received is a second or downsweep pulse, the amount of time until receipt of the next pulse will be more than the time $T_f$ or $T_r$, and thus the one-shot multivibrator will automatically re-cycle in order to become ready for the first or upsweep timing pulse. When the proper sequence is received, the output of the one-shot multivibrator provides a positive signal at the instant of an upsweep pulse and a negative signal at the instant of the downsweep pulse.

Referring again to Fig. 3 of the drawings, it will be seen that the positive and negative pulse outputs of the one-shot multivibrator are applied to a gate 34. The application of a positive pulse opens the gate 34 to connect the pulse output from a crystal clock 36 to the counter and indicator 38, each pulse from the crystal clock 36 being counted an appropriately displayed. In similar fashion, the following negative pulse output from the one-shot multivibrator 32 closes the gate 34, cutting off the clock 36 from the counter and indicator 38. Although the details of the clock 36 forms no part of this invention, a preferred embodiment is in the form of a quartz crystal oscillator.

The output of the one-shot multivibrator is also applied to a negative pulse selector 40 through a delay line 42. The output of the negative pulse selector 40 is then applied to a transfer gate 44 for the purpose of transferring the accumulated information from the counter into an appropriate readout or indicator. In addition, the output of the negative pulse selector 40 is also applied to the counter 38 through a second delay line 46 for the purpose of applying an erase signal, thereby erasing the readout and resetting the counter to zero, readying it for a new count.

While the receiver illustrated in Fig. 3 is preferred because of the high accuracy which may be achieved through the use of digital techniques, an analog indicator system may also be used. A suitable analog system is illustrated in Fig. 5, to which reference is now made. This system uses a receiver identical to that illustrated in Fig. 3 for the purpose of processing the received timing pulses to operate the one-shot multivibrator 32. The positive pulse output from the one-shot multivibrator 32 operates to open a main gate 50 which permits the application of regulated pulses from a crystal clock 52 to a conventional staircase counter 54. The details of the staircase counter form no part of this invention and, therefore, are not shown, but a suitable staircase counter is disclosed in the co-pending application of Homer G. Boyle entitled "Linear Staircase Counter," Serial No. 740,634, filed June 9, 1958, now Patent No. 2,922,041, and assigned to the same assignee as this invention.

The succeeding negative pulse from the multivibrator 32 occurring at time $T_2$ is applied through a delay line 56 and a negative pulse selector circuit 58 to open a transfer gate 60, thus permitting transfer of the voltage from the staircase counter 54 to a readout storage condenser 62. The voltage built up on condenser 62 is then amplified in a conventional high impedance follower 64 and displayed on an analog type indicator 66.

After a second delay in the delay line 68 the output from the negative pulse selector 58 is used for resetting the staircase counter 54, thereby making the system ready for the next series of timing pulses.

Thus far, there has been described a digital and an analog type of computing system for determining the elevation angle of an aircraft approaching an air field runway or landing strip. As was previously indicated, the principles of this invention are equally applicable to systems for determining azimuth and range, and one embodiment of such systems is diagrammatically illustrated in Fig. 6.

For determining range, an antenna 70 similar to the elevation angle-determining antennas $12_t$ and $12_r$ is turned 90 degrees from the position occupied for elevation angle measurement. That is to say, an antenna beam pattern identical to that illustrated in Fig. 4 is generated by the antenna 70, but its narrow dimension is in azimuth rather than in elevation. As shown in the drawing, the antenna 70 is located at some base line distance B to the center of the runway. Similarly disposed antennas $72_t$ and $72_r$ are located at the center line of the runway. The antennas 70 and 72 will each generate a wide angle in elevation to eliminate the need for vertical scanning.

Assuming that the aircraft 10 is closely aligned with the runway, then the range R of the aircraft from a reference point on the runway will be equal to the tangent of the horizontal angle $\theta$ multiplied by the base line distance B. The narrow beam of antenna 70 will, as in the embodiment illustrated in Fig. 1, be oscillated from the base line B (which establishes one reference) through a predetermined angle at a controlled linear rate. If an aircraft is intercepted, then the pulse received during the sweep in one direction provides a start pulse, and during the sweep in the other direction provides a stop pulse for the crystal clock of the system. Knowing $T_c$, the angle $\theta$ may be derived in the manner explained in connection with Figs. 1–4. With known techniques, range R may be computed by multiplying the known distance B by the tangent of $\theta$.

The azimuth measuring system is identical to the range measuring system with the exception that the antenna 72 is located at or near the center of the runway and is oscillated from a predetermined reference line A through an angle X equally on both sides of the center line of the runway. It will be recognized that when an aircraft is flying at ½X degree azimuth angle with respect to the reference line A, it will be at the center line of the runway. The time interval between successive starting and stopping pulses can be used to determine when such angle exists in exactly the same manner as disclosed in connection with Figs. 1–4.

Fig. 7 illustrates another arrangement for determining azimuth and range. In this embodiment antennas 74 and 76 are mounted at opposite ends of a base line $B_1$ which is bisected by the center line of the runway and which is perpendicular thereto. The antenna 74 is oscillated from the base line $B_1$ through a predetermined angle and, as before, the interval between received pulses at the aircraft is a determination of the angle $\theta_1$. Similarly, the antenna 76 is rotated from the base line $B_1$ through an identical predetermined angle, the time interval between successive received pulses of the aircraft determining the angle $\theta_2$. Knowing the length of the base line $B_1$ and the angles $\theta_1$ and $\theta_2$, the position of the aircraft in range and azimuth with respect to the center line of the runway may be determined by simple computing methods. As before, it will be necessary that the radiated frequency of antennas 74 and 76 be slightly different so as to enable the use of a single receiver on the aircraft.

Thus, it is seen that there has been provided simple apparatus for furnishing all necessary azimuth, elevation and range information. The airborne equipment is simple and passive, requiring only the functions of receiving and timing the intervals between successive pulses. Because of the fact that a narrow beam antenna pattern is used, there will be low ground deflection and, hence, high accuracy even at low angles.

This invention has unlimited capacity in that all aircraft in the range of the transmitted beam can gather the necessary information. It does not require interrogation nor is response from the aircraft to the ground station required. The only portion of the system which need be accurately controlled is the transmitting antenna, but since this is ground gear it may be made precise, and various monitoring systems are available for checking its operation. Further, each of the systems for gathering range, elevation and azimuth data are compatible and may be used with a single common receiver, provided each operates at a slightly different frequency to allow identification and separation of the signals.

While in Figs. 2 and 6 the positions of the antennas 12 and 72 are illustrated as being located at the center of the runways, it is to be understood such a location would not be practical as it would interfere with landing aircraft. However, very little accuracy is sacrificed by placing the antenna to one side of the runway. Having thus described preferred embodiments of the invention, I claim:

1. In a system for determining the angle between a reference plane and an imaginary line, said line being drawn in a second plane perpendicular to said reference plane from a reference point in the reference plane and through an object in space, the combination comprising: a source of radiant energy; means at said reference point for alternately radiating a beam of said energy into space for a first interval of time and for discontinuing radiation of said beam during a subsequent second interval of time at least as long as said first interval; means for repeatedly sweeping said beam from said reference plane through a predetermined angle in said second plane and back to said reference plane during said first interval; means at said object for detecting said beam as said beam impinges upon said object; and additional means at said object for measuring intervals of time no longer than said first interval between successive detections of said beam, said measured interval being a determinant of said angle between said reference plane and said imaginary line.

2. The invention as defined in claim 1 wherein said additional means comprise a clock; a one-shot multivibrator for starting and for stopping said clock; means responsive to the detection of said beam as it impinges upon said object in one direction for initiating operation of said multivibrator whereby the operation of said clock is started; and means responsive to the detection of said beam as it impinges upon said object in the opposite direction for re-cycling said one-shot multivibrator; means for automatically re-cycling said one-shot multivibrator after the lapse of a period of time greater than said first interval.

3. The invention as defined in claim 1 wherein said angle is in a vertical plane.

4. The invention as defined in claim 1 wherein said second interval is longer than said first interval.

5. In a method for determining the angle between a reference plane and an imaginary line, said line being drawn in a second plane perpendicular to said reference plane from a reference point in the reference plane and through an object in space, the steps of: alternately radiating a beam of energy into space for a first predetermined interval of time and discontinuing radiation of said beam during a subsequent second interval of time at least as long as said first interval; repeatedly sweeping said beam from said reference plane through a predetermined angle in said second plane and back to said reference plane during said first interval; detecting said beam at said object as said beam impinges upon said object; and measuring intervals of time no longer than said first interval occurring between successive detections of said beam, said interval of time being a determinant of said angle between said reference plane and said imaginary line.

6. The invention as defined in claim 5 wherein said second interval is longer than said first interval.

References Cited in the file of this patent

UNITED STATES PATENTS

| | | |
|---|---|---|
| 1,437,400 | Conners | Dec. 5, 1922 |
| 2,586,810 | Frum | Feb. 26, 1952 |